United States Patent
Sanz Ananos et al.

(10) Patent No.: US 10,449,722 B2
(45) Date of Patent: Oct. 22, 2019

(54) FABRICATING THREE DIMENSIONAL OBJECTS

(71) Applicants: Hewlett-Packard Development Company, L.P., Houston, TX (US); Santiago Sanz Ananos, Sant Cugat del Valles (ES); Isabel Sanz Ananos, Sant Cugat del Valles (ES); Sergi Culubret, Sant Cugat del Valles (ES)

(72) Inventors: Santiago Sanz Ananos, Sant Cugat del Valles (ES); Isabel Sanz Ananos, Sant Cugat del Valles (ES); Sergi Culubret, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 42 days.

(21) Appl. No.: 15/540,921

(22) PCT Filed: Jan. 30, 2015

(86) PCT No.: PCT/EP2015/051949
§ 371 (c)(1),
(2) Date: Jun. 29, 2017

(87) PCT Pub. No.: WO2016/119885
PCT Pub. Date: Aug. 4, 2016

(65) Prior Publication Data
US 2017/0368756 A1    Dec. 28, 2017

(51) Int. Cl.
*B29C 64/393* (2017.01)
*B33Y 30/00* (2015.01)
(Continued)

(52) U.S. Cl.
CPC .......... *B29C 64/393* (2017.08); *B29C 64/165* (2017.08); *B29C 64/20* (2017.08);
(Continued)

(58) Field of Classification Search
None
See application file for complete search history.

(56) References Cited

U.S. PATENT DOCUMENTS

| 6,850,334 B1 | 2/2005 | Gothait |
| 7,680,555 B2 | 3/2010 | Dunn et al. |
| 2002/0106412 A1 | 8/2002 | Rowe et al. |

FOREIGN PATENT DOCUMENTS

| CN | 101952109 A | 1/2011 |
| CN | 103357875 | 10/2013 |

(Continued)

OTHER PUBLICATIONS

International Search Report and Written Opinion dated Oct. 8, 2015, PCT Patent Application No. PCT/EP2015/051949, filed Jan. 30, 2015, European Patent Office.

(Continued)

*Primary Examiner* — Edmund H Lee
(74) *Attorney, Agent, or Firm* — HP Inc. Patent Department

(57) ABSTRACT

A method of fabricating a three dimensional object is provided. A build layer comprising an area of solidified build material and an area of non-solidified build material is formed. The build layer is formed by depositing a layer of non-solidified build material and treating the build material to form the area of solidified build material. The method also involves determining an edge profile for the build layer. Determining the edge profile involves measuring a variation in height of the build layer across a transition between the area of solidified build material and the area of non-solidified build material.

15 Claims, 4 Drawing Sheets

(51) Int. Cl.
*B29C 64/165* (2017.01)
*B29C 64/20* (2017.01)
*B33Y 10/00* (2015.01)
*B33Y 50/02* (2015.01)

(52) U.S. Cl.
CPC ............... *B33Y 10/00* (2014.12); *B33Y 30/00* (2014.12); *B33Y 50/02* (2014.12)

(56) References Cited

FOREIGN PATENT DOCUMENTS

| | | | |
|---|---|---|---|
| CN | 101842222 B | 3/2017 | |
| EP | 1415791 | 5/2004 | |
| EP | 2815872 | 12/2014 | |
| EP | 2902174 | 8/2015 | |
| EP | 2447045 A3 | 12/2017 | |
| GB | 2422344 | 7/2006 | |
| JP | H06503764 A | 4/1994 | |
| JP | H1134776 A | 12/1999 | |
| JP | 2005007572 A | 1/2005 | |
| JP | 2013151165 A | 8/2013 | |
| WO | WO0052624 * | 9/2000 | ............. B29C 41/36 |
| WO | WO-2005097476 | 10/2005 | |

OTHER PUBLICATIONS

Veronika, C. et al., "Hot Melt Inks for 3D Printing", Jan. 1, 2005, pp. 6.

\* cited by examiner

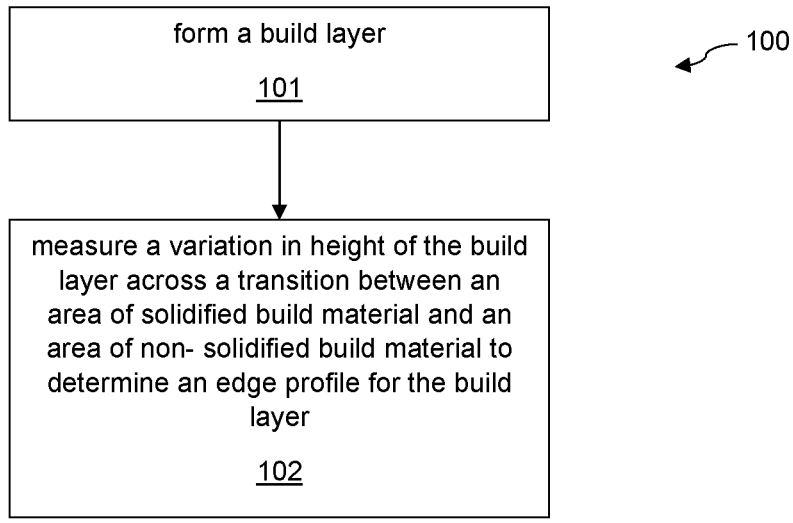
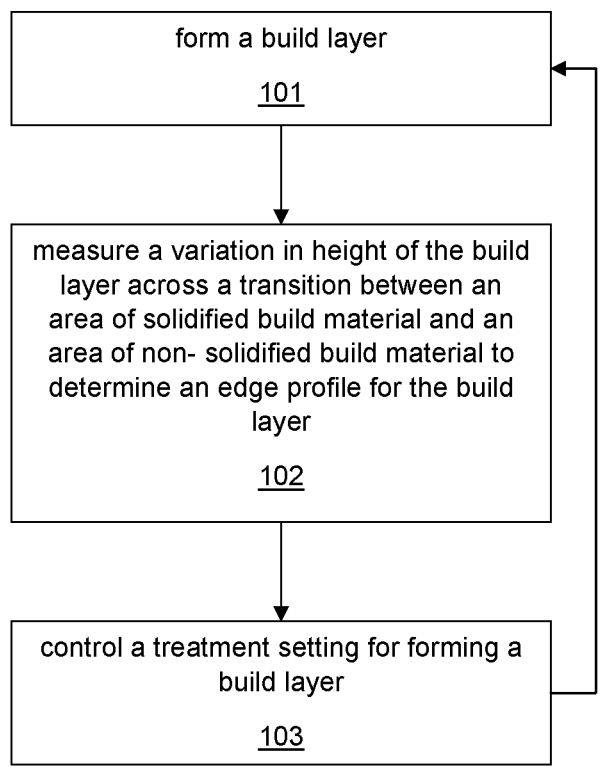
Figure 1a
Figure 1b

FABRICATING THREE DIMENSIONAL OBJECTS

CLAIM FOR PRIORITY

The present application is a national stage filing under 35 U.S.C. § 371 of PCT application number PCT/EP2015/051949, having an international filing date of Jan. 30, 2015, the disclosure of which is hereby incorporated by reference in its entirety.

Additive manufacturing systems that generate three-dimensional objects on a layer-by-layer basis have been proposed as a potentially convenient way to produce three-dimensional objects.

Some additive manufacturing systems operate by selective treatment of a build material. To form an individual layer or slice of the object being fabricated a layer of suitable build material is deposited in a fabrication area and the build material is treated so as to solidify the build material in a selected area that corresponds to a slice of the object being fabricated. The rest of the build material remains non-solidified.

Examples will now be described, by way of non-limiting example, with reference to the accompanying drawings, in which:

FIGS. 1a and 1b are examples of methods according to the disclosure;

Figure 2:
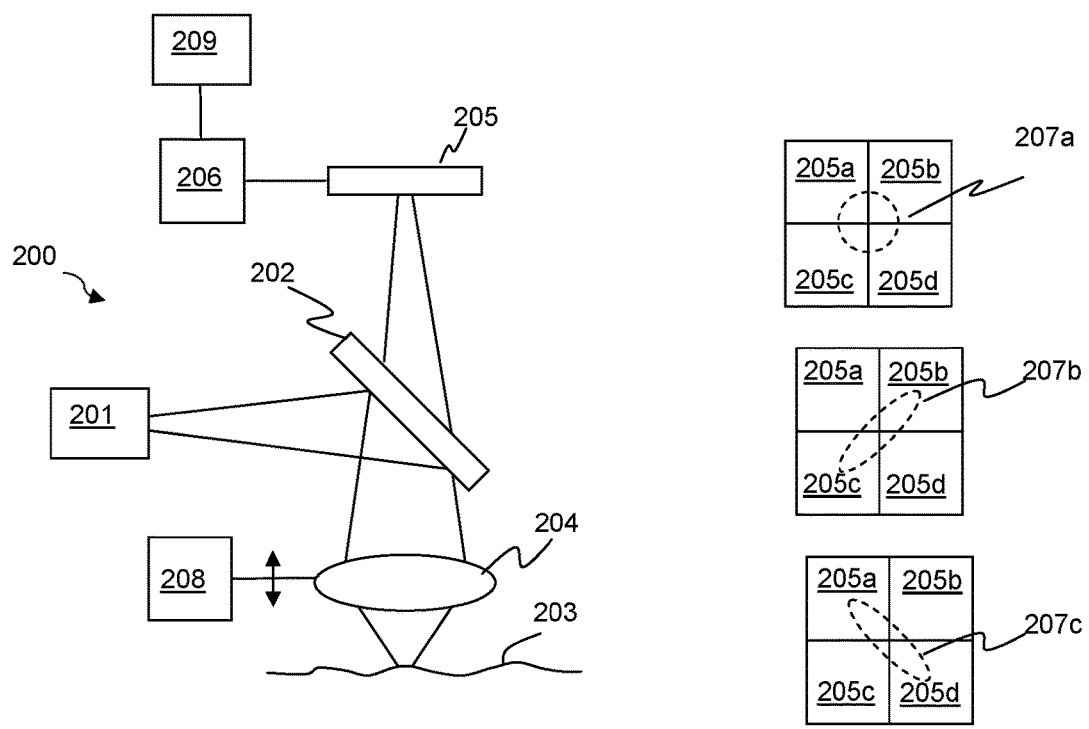
FIG. 2 shows an example of an optical sensor apparatus.

Additive manufacturing systems have been proposed to fabricate three dimensional objects. Additive manufacturing systems fabricate an object on a layer by layer basis. A notional model, for example a computational model, of the object to be produced may be divided into a series of slices through the object. Each such slice is then produced in sequence, with a subsequent slice being formed on an earlier slice to form the overall object.

Some additive manufacturing systems form each layer by selective treatment of a build material. A layer of suitable build material may be deposited in a build area. The build material may then be treated so as to solidify the build material in a selected area corresponding to the slice or piece of the object being fabricated, with build material in an area that does not correspond to the object being fabricated remaining non-solidified. The treated layer, which will be referred to herein as a build layer, thus may comprise an area of solidified build material and an area of non-solidified build material. Depending on the object or objects being fabricated there may be one area of solidified build material in a given build layer or there may be a plurality of separate areas of solidified build material each of which may be surrounded by an area of non-solidified build material, or at least partly surrounded if the area of the solidified build material extends to an edge of the fabrication area. It will be appreciated that the most recent build layer will be the uppermost layer of a build area and may be formed on previous build layers, with the solidified area of build material of one build layer being fused to that of the preceding build layer.

In some examples treatment of the build material to form the build layer may comprise selectively delivering an agent to at least one portion of a surface of the layer of build material and temporarily applying a predetermined level of energy to the layer of build material. In some examples an agent which is delivered may be a coalescing agent. The coalescing agent may, for example, be selectively delivered to an area of the build material corresponding to the slice of the object being fabricated. In some examples an agent applied may be a coalescence modifier agent. In some examples both coalescing agent and coalescence modifier agent may be selectively delivered.

The temporary application of energy may cause portions of the build material on which coalescing agent has been delivered or has penetrated to heat up above the melting point of the build material and to coalesce. This temperature is referred to herein as the fusing temperature. Upon cooling, the portions which have coalesced become solid and form part of the three-dimensional object being generated.

A coalescence modifier agent may be used for a variety of purposes. In one example, a coalescence modifier agent which serves to reduce the degree of coalescence of build material to which it has been applied and/or penetrated may be used. Such a coalescence modifier agent, which may be seen as a coalescence inhibitor, may be delivered to areas of the build material adjacent to areas where coalescing agent is delivered, for example to help reduce the effects of lateral coalescence bleed. This may be used, for example, to improve the definition or accuracy of object edges or surfaces, and/or to reduce surface roughness. In another example, coalescence modifier agent may be delivered interspersed with coalescing agent, which may be used to enable object properties to be modified.

In the examples described herein a coalescing agent and/or a coalescence modifier agent can comprise fluids that may be delivered using any appropriate fluid delivery mechanism, also referred to as an agent distributor. In one example the agents are delivered in droplet form. The coalescing agent may be a strong light absorber such as a pigment colorant. In some examples, the agent distributor may be a printhead. The agent distributor may, for example, be located on a suitable scanning stage.

According to one non-limiting example, a suitable coalescing agent may be an ink-type formulation comprising carbon black, such as, for example, the ink formulation commercially known as CM997A available from Hewlett-Packard Company. In one example such an ink may additionally comprise an infra-red light absorber. In one example such an ink may additionally comprise a near infra-red light absorber. In one example such an ink may additionally comprise a visible light absorber. Examples of inks comprising visible light enhancers are dye based coloured ink and pigment based coloured ink, such as inks commercially known as CE039A and CE042A available from Hewlett-Packard Company.

In one example a salt solution may be used as a coalescence modifier agent. In another example an ink commercially known as CM996A ink and available from Hewlett-Packard Company may be used as a coalescence modifier agent. In another example an ink commercially known as CN673A ink and available from Hewlett-Packard Company has also been demonstrated to work as a coalescence modifier agent.

In the examples described herein references to a build material may include, for example, a build material that is a powder-based build material. As used herein, the term powder-based material is intended to encompass both dry and wet powder-based materials, particulate materials, and granular materials. The build material may comprise a single material or may be a composite of a plurality of components materials. In some examples, the build material is a normally weakly light absorbing polymer powder medium. In other examples, the build material is a thermoplastic.

In the examples described herein, the three dimensional object is built up by sequentially layering and fusing portions of layers of build material one on top of another. A layer of non-solidified build material is deposited to form a flat surface, referred to herein as a build surface. This layer is treated, for example as described in one of the examples discussed above, to form a build layer with areas of solidified build material. A new layer of build material may then be deposited over the previous build layer to form a new flat surface for forming the next build layer. This process may be repeated until the desired object is formed. The formed object is thus complete and supported by non-solidified build material during fabrication. Once the object has properly cooled it can be removed from the fabrication area and separated from the non-solidified build material.

The properties of the fabricated object depend on a number of different factors. The original notional model of the object used and the number and size of the slices defined will clearly have an impact. For the actual fabrication process itself the material used, e.g. the build material, coalescing agent, and coalescence modifier agent if used, will influence properties, as will a number of the settings of the fabrication process such as the amount of agent used, e.g. drop density, drop size etc, and energy applied, e.g. amount or duration of heating.

One property that may be of interest is surface roughness. The surface roughness of the fabricated object may depend, at least partly, on the transition between the areas of solidified build material and non-solidified build material in a build layer. The profile of the transition between the edge of the slice of fabricated object (i.e. solidified region) and the non-solidified build material may thus impact on the quality of the finished object. Imprecise edges may lead to low accuracy of the fabricated pieces.

Treatment settings of an additive manufacturing system may therefore be set to provide a certain edge precision for the materials being used. It has been appreciated however that changes in ambient conditions or indeed in the way the additive manufacturing system is operating may result in poor edge definition.

For instance if there is a change in ambient conditions that results in too much heat being applied during the treatment process, then build material that was not intended to be melted can inadvertently be fused. The ambient conditions could for instance mean that the amount of coalescence modifier agent used was insufficient, resulting in edges that are as sharp as intended, impacting the piece quality. Furthermore misalignment of the agent distributor or cross-contamination between the coalescence modifier and coalescing agents may in some instances be a factor in inaccurate edges.

In examples of this disclosure an edge profile is determined for a build layer. The edge profile may be determined by measuring a variation in height of the build layer across a transition between the area of solidified build material and the area of non-solidified build material. In some examples a treatment setting for forming a subsequent build layer may be controlled based on the edge profile.

As noted above fabricating a three dimensional object with an additive manufacture system may involve depositing a layer of build material and treating the layer to form a build layer comprising an area of solidified build material and an area of non-solidified build material. Forming the solidified area of build material may involve causing the build material in the selected area to heat up and coalesce and then cool and solidify. This coalescence of the build material, which may be deposited in a powder-based form, in the selected areas results in the thickness of the solidified build material being lower than the thickness of the non-solidified build material for a build layer. For example the build material may be deposited, before treatment, to a first thickness. After treatment any area of solidified build material of the build material may have a second, lower thickness. For example, a first thickness of the order of 100 µm may, in some material systems, lead to a second thickness of the order of 50 µm. The thickness of any non-solidified build material of the build layer may remain however substantially equal to the first thickness, e.g. 100 µm in the example given.

It has been appreciated therefore that the difference in height in a region of transition between an area of solidified build material and an area of non-solidified build material can therefore provide information about a profile of the edge of the solidified area.

FIG. 1a illustrates one example of a method 100 of fabricating an object according to the disclosure. The method comprises forming 101 a build layer comprising an area of solidified build material and an area of non-solidified build material. Forming the build layer may comprise depositing a layer of non-solidified build material and treating the build material to form the area of solidified build material. The build layer may be formed by any of the examples discussed previously.

The method further comprises determining 102 an edge profile for the build layer. Determining the edge profile may comprise measuring a variation in height of the build layer across a transition between an area of solidified build material and an area of non-solidified build material.

According to an example, the variation in height can be measured using an optical sensor. In some examples the optical sensor may comprise an optical focus error sensor.

Optical focus error sensors are used in a range of applications, for instance as optical pickups for CD or DVD read heads or the like. Such sensors are therefore readily commercially available at relatively low cost.

FIG. 2 illustrates an example of an optical focus error sensor 200. An optical source 201 generates a beam of optical radiation which is directed to an element such as a beam splitter 202. The beam splitter 202 directs at some of the optical radiation to a surface 203 to be analysed via lens 204. Radiation which is reflected from the surface is directed back via lens 204 and beamsplitter 202 to a detector 205. The detector 205 can determine the shape of the reflected beam incident on the detector and may, for example, be four a quadrant photodetector with sensing quadrants 205a-d arranged in a square grid as illustrated in the right hand side of FIG. 2. The detector may be connected to a readout circuit 206. The readout circuit may determine a focus error signal. In some examples the focus error signal is determined by summing the photocurrents from diagonally opposed quadrants, i.e. summing the photocurrents from quadrants 205a and 205d and also summing the photocurrents from quadrants 205b and 205c, and determining a difference between the sums. A value FE corresponding to the focus error may therefore be determined as:

$$FE=(I_a+I_d)-(I_b+I_c) \qquad \text{Eqn. (1)}$$

where $I_a$ is the photocurrent from quadrant 205a, $I_b$ is the photocurrent from quadrant 205b, $I_c$ is the photocurrent from quadrant 205c and $I_d$ is the photocurrent from quadrant 205d.

The sensor set-up is such that the shape of the reflected beam received at the detector 205 depends on the distance between the lens 204 and the reflecting surface 203. When the surface 203 is located at a characteristic length, e.g. a focal length, the shape of the beam incident on the detector 205 is circular. As illustrated in the top right plot of FIG. 2 the circular shape 207a may illuminate all quadrants 205a-d of the detector substantially equally. In this instance the value FE corresponding to the focus error is substantially equal to zero, i.e. the sum of the photocurrents from quadrants 205a and 205d will be substantially equal to the sum of the photocurrents from quadrants 205b and 205c.

The sensor 200 is also arranged such that, at least within a certain range of the characteristic length, the reflected beam departs from having a circular shape and starts to exhibit an elongated or elliptical shape, with the extent and axis of elongation being related to the extent of departure from the characteristic length.

The beamsplitter 202 introduces a degree of astigmatism into the optical path such that were the distance between lens 204 and the surface to increase from the characteristic length, i.e. the surface was to become more distant, then the dimensions of the beam on the detector will increase along a first axis whilst decreasing along a second orthogonal axis. The middle right plot of FIG. 2 illustrates a shape 207b that may result when the surface is further away from the sensor than the characteristic length. In this instance the sum photocurrents from quadrants 205a and 205d will be lower than the sum photocurrents from quadrants 205b and 205c. Thus the value FE corresponding to the focus error will be negative with a value related to how far the distance between the sensor 200 and the surface 203 is from the characteristic length.

However were the distance between lens 204 and the surface to decrease from the characteristic length, i.e. the surface was to become closer, then the dimensions of the beam on the detector will decrease along the first axis whilst increasing along the second orthogonal axis. The bottom right plot of FIG. 2 illustrates a shape 207c that may result when the surface is closer to the sensor than the characteristic length. In this instance the summed or combined photocurrents from quadrants 205a and 205d will be greater than the summed or combined photocurrents from quadrants 205b and 205c. Thus the value FE corresponding to the focus error will be positive, again with a value related to how far the distance between the sensor 200 and the surface 203 is from the characteristic length.

The relationship between the value FE corresponding to the focus error and the distance of the surface from the sensor 200 is substantially linear for a certain distance range. This linear range may be defined by the arrangement of the components of the sensor, but in one example the focus error value may be linear over a range of about 5 µm or so, for instance a range of 6 µm. The optical sensor may therefore be able to determine variation in height with a spatial resolution lower than 5 µm or so, i.e. any differences in height can be characterised to a precision greater than 5 µm or so.

By scanning the optical sensor transversely with respect to the surface of the build layer, the distance between the surface of the build layer and the sensor may vary with any height changes, leading to a detectable change in the value related to focus error.

As mentioned the range of operation where the focus error is linearly related to distance may be less than the expected total height variation across the build layer. For example with some systems the expected change in height across the build layer from an area of solidified build material to an area of non-solidified build material may be over the order of 50 µm.

The optical sensor may therefore comprise a translation stage 208 for longitudinal translation of the optical sensor, or at least part of the optical sensor. The translation stage may for instance translate the lens 204 with respect to the beam splitter. In some examples the translation stage may for example comprise an inductor which provides linear longitudinal translation of the lens 204 with the extent of translation being determined by the current supplied to the inductor, with a known amount of current providing a known displacement.

Thus in one example the optical sensor may initially be located above the surface of the build region near a transition between solidified and non-solidified areas of build material. Consider that the build layer is generally oriented parallel to an x-y plane so that the height to be measured corresponds to the z-direction. The translation stage 208 may be controlled to move the lens 204 in the z-direction until the value corresponding to the focus error is substantially zero. It is thus known at that location the surface of the build layer is the characteristic length from the optical sensor in the z-direction. The optical sensor may then be translated in a transverse direction, e.g. parallel to the x-y plane, whilst maintaining its position in the z-direction. Any changes in height of the layer will result in the surface being closer or further away than the characteristic length and thus a detectable change in the value corresponding to focus error which can be logged, along with the x-y position of the sensor.

If the change of height is sufficient that the distance between the sensor and the surface at a given location nears the end of the linear operating range of focus error, the translation stage may be operated at that location to move the sensor until the focus error reaches zero. The previously determined distance for that location may be stored and the transverse scanning resumed. In this way the height variation over the whole of a transition region between an area of solidified build material and an area of non-solidified build material may be determined with a high degree of precision.

As mentioned the height variation across a transition region between solidified and non-solidified areas of the build layer may be measured by scanning the optical sensor across the transition region, measuring the change in profile of the reflected beam and processing the measurements to obtain a change in height. As noted above, optical sensor may be a sensor similar to optical pickups for CD/DVD readers and thus may be readily commercially available in a small form factor and at low cost.

It should be noted the optical sensor may comprise components in addition to those shown in FIG. 2. For example, an optical sensor may comprise a quarter wave plate, additional lenses and/or a diffraction grating. These components may be provided instead of, or in addition, to the components shown in FIG. 2.

In some examples other types of sensor may be used to measure the variation in height across the build layer. Other types of ranging or distance measuring sensor may be used, which may or may not be optical.

The optical sensor may be in communication with a controller 209. The controller 209 may comprise a processor for processing the signals detected by the optical sensor to determine a height value and thus determine the edge profile.

The processor may be a dedicated processor for determining an edge profile or may be a processor of the additive manufacturing system which also performs other tasks. In some examples however the readout circuit 206 may determine the height profile in which case the controller 209 may control a setting of the additive manufacturing system based on the edge profile as will be described later.

In some examples, the optical sensor may be mounted on a scanning stage moveable with respect to the build layer. An example scanning stage 300 is illustrated in FIG. 3, which shows a build layer 302 and a scanning stage 304 having an optical sensor 306.

Figure 3:
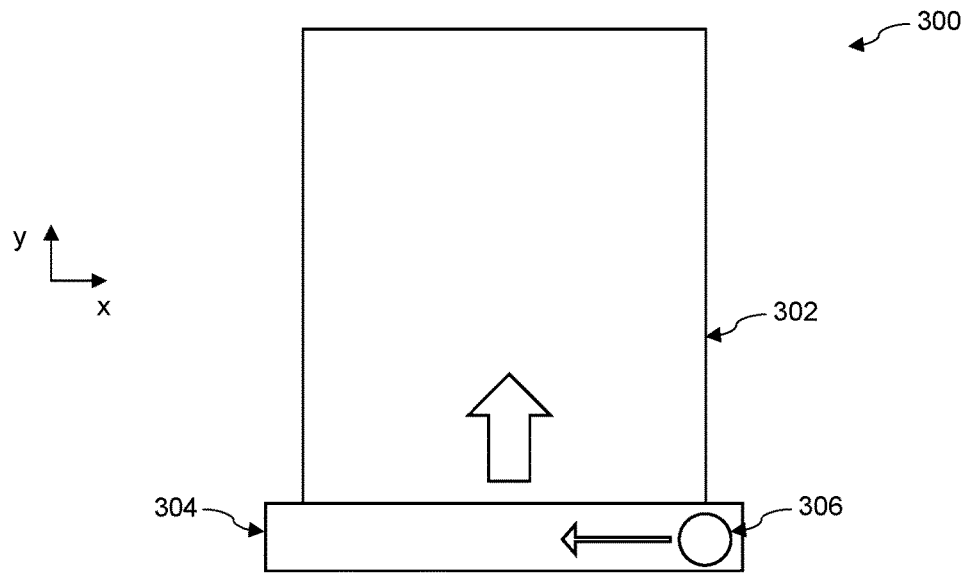
FIG. 3 shows an example additive manufacturing systems according to the disclosure.

In some examples the scanning stage may movable with respect to the build layer along a linear axis, referred to herein as a scanning axis, for example the y-axis shown in FIG. 3 as indicated by the large arrow. The scanning stage 304 may extend along an axis orthogonal to the scanning axis such that it spans the full width of the build layer, e.g. the x axis. The optical sensor 306 may be able to move linearly along the scanning carriage, i.e. orthogonal to the scanning axis, e.g. along the x axis as indicated by the small arrow in FIG. 3. As such, the optical source is able to move in two dimensions and scan across the full area of the build surface.

It should be understood that other arrangements of the optical sensor are possible. For example, the scanning stage, which may not extend across the whole width of the build layer, may be able to move independently along two scanning axes thereby enabling the optical sensor to be moved across the full area of the build layer. In a further example, the optical may be constrained to move along a single axis, thereby being restricted to determining a profile along a single cross section of the build layer in each scan.

The optical sensor may be mounted such that it can be positioned at substantially any location within a scan area of build area. The scan area may comprise the whole of the build layer if for instance there is just one optical sensor. In some examples however there may be a plurality of optical sensors and in such example an optical sensor may be arranged with a scan area that does not extend over the whole of the build layer.

The optical sensor may be located on its own dedicated scanning stage. However in some examples the optical sensor may be located on a scanning stage that also carries some other components of an additive manufacturing system. Some other components of the additive manufacturing system may be located on a scanning stage and thus the optical sensor could effectively be added to an existing scanning stage. For instance the optical sensor may be located on a scanning stage with an agent distributor to distribute an agent to the non-solidified build material to control coalescence, for example an agent distributor for distributing coalescing agent and/or coalescence modifier agent. In some examples optical sensor may be located on a scanning stage with a coating mechanism for coating the build surface with the next layer of build material. In some examples optical sensor may be located on a scanning stage with a heating element for heating the build surface.

It should be understood that other components in addition to those noted above may additionally or alternatively be mounted on a scanning stage with the optical sensor. Furthermore, an additive manufacturing system for fabricating a three dimensional object may comprise more than one scanning stage.

As discussed above an edge profile may thus be determined by measuring a variation in height of a build layer in a transition region between areas of solidified and non-solidified build material. The preceding examples discuss optical sensors that can readily be integrated into additive manufacture systems and used to determine the height variation for a build layer after it has been formed and before the next build layer is formed.

The edge profile thus provides information about the quality of the edges of the slice of the object being formed. In some example this may provide an indication of the surface roughness of the finished object. A good quality edge may have a sharp transition between the area of solidified build material and the area of non-solidified build material. Such an edge may lead to a height profile that has an effective step like profile. The area of non-solidified build material will have a first height and the area of solidified build material will have a second lower height. If there is a sharp transition between the two areas there will be a step change in height or a ramp in height over a relatively short transverse distance. However in some instances the edge may not be sharp. Some, but not all, of the material outside of the area corresponding to the slice of the object being fabricated may have solidified. Thus a depth section through that part of the build layer may encounter some build material that has solidified and some build material that has not. The resulting height of the build layer at that point will be somewhere between the first and second heights.

Figure 4:
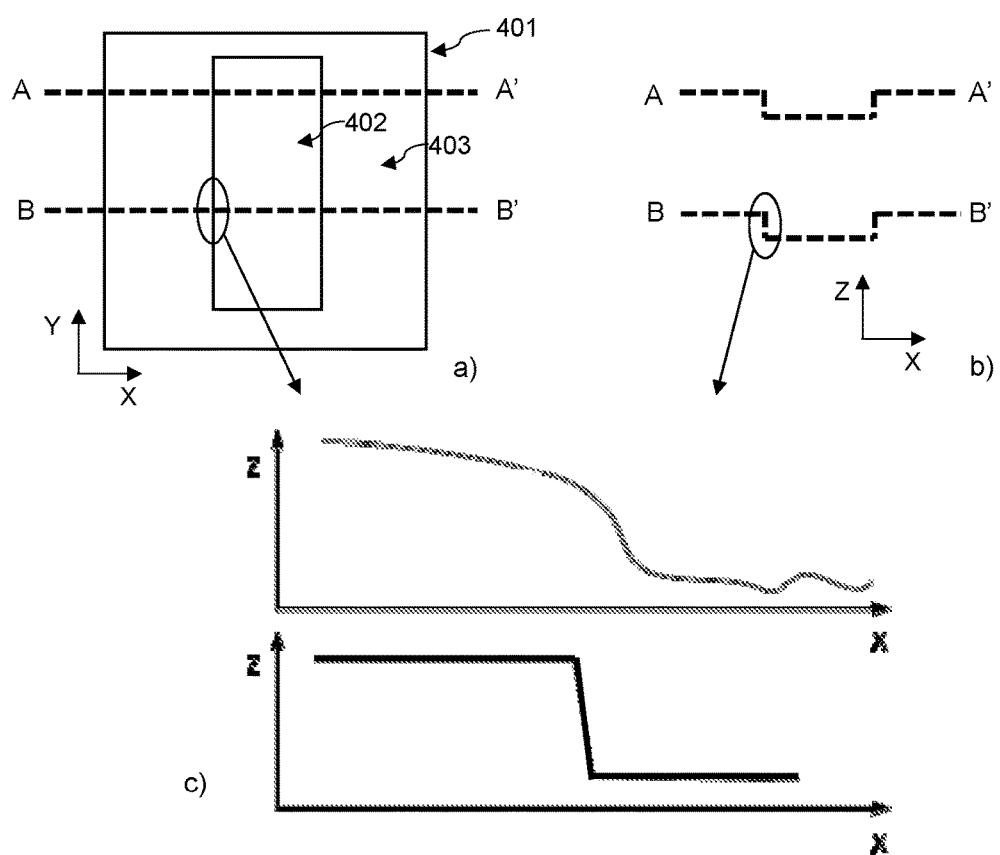
FIG. 4 illustrates examples of profiles through different cross sections of a layer of build material.

An example profile is illustrated in FIG. 4. FIG. 4(*a*) shows an example of the upper surface of a build layer 401. The build layer 401 of this example comprises an area of solidified build material 402 and an area of non-solidified build material 403. It will be appreciated that the number, shape, size and location of the relevant areas will be determined by the particular slice of the object(s) being fabricated. Edge profiles may be determined by measuring a variation of height in at least a region of transition between areas 402 and 403.

FIG. 4*a* illustrates that for example profiles may be determined, as illustrated by the dotted lines A-A' and B-B'. FIG. 4(*b*) shows general examples of how the height of the build layer, e.g. as measured in the z-direction, may vary across the scan lines A-A' and B-B' of the build layer. For the area of solidified build material 402 the build material has coalesced and thus is more compact then the area of non-solidified build material 403. The height of the area of solidified build material 402 is thus lower than the area of non-solidified build material 403.

FIG. 4(*c*) illustrates an edge profile, e.g. for the encircled edge region between the area of solidified build material 402 and an area of non-solidified build material 403. As mentioned for a good quality edge there should be a sharp or clean transition in the edge regions, as indicated by the reference profile in the lower portion of FIG. 4(*c*). An edge profile such as that shown in the upper example of FIG. 4(*c*) may be an example of an edge profile that does not indicate a sharp or clean transition. It can be seen the height of the edge profile varies over a relatively long lateral distance. It can also be seen that the steepest region of the edge profile is slightly misaligned from the location of the step in the reference profile. Such an edge profile may therefore indicate that the edges of the solidified areas of build material are of a relatively low quality.

The edge profiles may thus be used to characterise a quality of the edges of the object being formed. In some examples a determined edge profile may be used to control a treatment setting of the additive manufacturing system. This can be done in a closed loop manner to enhance the edge sharpness.

FIG. 1b illustrates an example of a method according to this disclosure. Like the method described with reference to FIG. 1a, the method of this example may involve forming 101 a build layer and determining 102 an edge profile. In the method of this example the method may also involve controlling 103 a treatment setting for forming a build layer, e.g. controlling a build parameter of the additive manufacturing system, and then proceeding to form 101 a subsequent build layer using the relevant treatment settings.

Figure 5:
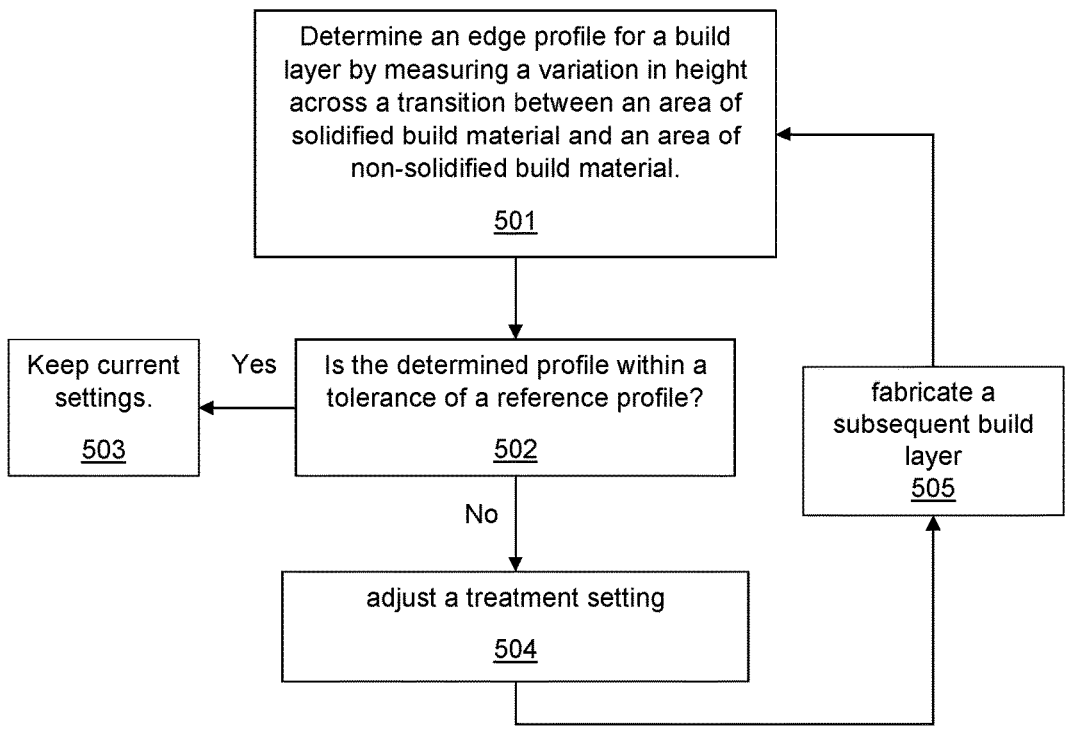
FIG. 5 shows another example of a method of fabricating a three dimensional object.

An example method according of fabricating a three dimensional object with control of treatment setting, e.g. calibration of the additive manufacturing system, is illustrated with respect to FIG. 5. An edge profile may be determined 501 for a build layer by measuring a variation in height across a transition between an area of solidified build material and an area of non-solidified build material. The edge profile may be determined in accordance with any of the examples discussed above.

It may then be determined 502 whether a characteristic of the edge profile is within a tolerance of a reference characteristic, for example of a reference profile. This may involve comparing the determined edge profile to a reference profile. The reference profile may for example have a form such as the sharp edged profile as illustrated in the lower portion of FIG. 4(c). It should be understood that a range of reference profiles are possible, including, but not limited to, a step function, a flat slope or a curve.

Various characteristics could be considered. For example the determined edge profile could be analysed to identify a region of relatively constant height corresponding to fully solidified build material and another region of relatively constant height corresponding to fully non-solidified build material. The distance between these two regions may be indicative of the width of an edge region and the width of the edge region may be one characteristic. A characteristic could be the maximum and/or minimum slope of the change of height in an edge region. A characteristic could be the location of the main change in height compared to a known location of the edge of the slice of the notional model of the object being fabricated. A characteristic could be the presence of bumps or significant local maxima or minima in the height profile in an edge region.

In some examples an edge profile may be compared with a reference profile by computing a deviation of the measured profile at a plurality of points along the profile, for example by subtracting the measured profile from the reference profile or otherwise comparing the height at each point with the reference, e.g. theoretical profile. In some examples, the deviations may be used to determine whether the profile is within a tolerance by comparing the deviations to a range of acceptable values for the deviation. If the measured deviations are greater than the acceptable values then the measured profile is not within a tolerance of the reference profile. If they are less than the acceptable values, then they are within the tolerance of the reference profile.

If the determined edge profile is deemed to be acceptable, for instance if it within a tolerance of the reference profile and is accurate enough for the particular build, then this indicates that the additive manufacturing system is operating adequately. Thus the current settings for the additive manufacturing system may be maintained 503. However, if the edge profile indicates that the edges are not acceptable, e.g. an edge is not sharp enough for the accuracy of the build, then a treatment setting may be adjusted 504 to attempt to increase accuracy. The treatment setting may be adjusted by a controller such as controller 209 illustrated in FIG. 2.

A treatment setting may therefore be controlled based on the determined edge profile. A treatment setting is a setting of the additive build process which may be controlled so as to vary a property of the treated build layer, e.g. a parameter of the fabrication of the three dimensional object. Where the determined edge profile is acceptable the relevant treatment setting may be maintained. However if the edge profile is not acceptable then the treatment setting may be adjusted. In some examples the treatment setting may be adjusted as part of an edge enhancement routine that is performed over the course of forming several different build layers, as will be described in more detail below.

In some examples therefore a treatment setting may be adjusted if a determined edge profile was not acceptable and a subsequent build layer, which may be but does not have to be the next build layer, may be fabricated 505. The edge profile for this subsequent build layer may therefore be determined. The edge profile can then be assessed to determine if the edge profile is now acceptable or not. If the edge profile is now acceptable the current treatment settings may be maintained and no further adjustment may be necessary. If however the edge profile remains not acceptable then a treatment setting may be adjusted again. This may be the same or a different treatment setting. In adjusting the treatment setting it may be assessed whether the previous change resulted in an increase in quality or not.

The method may thus repeat in an iterative fashion, with an edge enhancement routine altering the treatment settings, e.g. build parameters, between layers until a profile is determined that is within a tolerance of the reference profile. At this point, the printed edges have an acceptable sharpness and further adjustment may not be needed.

As mentioned in some example a treatment setting of the additive manufacturing system, i.e. of the fabrication process, may be controlled in an attempt control the edge sharpness. There are various factors that may influence the resulting edge sharpness of a build layer. Two of these factors are:

i) The amount of coalescence modifier agent used to limit or inhibit coalescence in areas adjacent the area corresponding to the slice of the object being fabricated. Increasing the amount of coalescence modifier agent applied to the edge region may reduce the melting in the transition region.

ii) The temperature profile: The energy imparted to the layer of build material, for instance the temperature of fusing lamps, and the duration of exposure of the layer of build material to an energy source such as fusing lamps affects the total conducted heat. Increasing the lamp temperature and/or reducing the exposure time may result in sharper edges.

A treatment setting that may be controlled may thus be the amount of coalescence modifier agent applied to the non-solidified build material to control coalescence. The amount of coalescence modifier agent may be controlled in various ways. An agent distributor of coalescence modifier agent may be controlled to change the drop size of coalescence modifier agent delivered and/or an agent distributor of coalescence modifier agent may be controlled to change the drop density of coalescence modifier agent and/or an agent distributor of coalescence modifier agent may be controlled to change the number of drops of coalescence modifier agent.

A treatment setting that may be controlled is alignment of an agent distributor to distribute an agent to the non-solidified build material to control coalescence. For instance the alignment of an agent distributor for coalescence modifier agent may be controlled, for instance by initiating a calibration or adjusting an alignment.

A treatment setting that may be controlled is a setting of temperature applied to the layer of build material to form the build layer. The temperature setting could be the temperature of a heater, such as a fusing lamp or the like. The temperature setting could be the duration that energy is applied to form the build layer.

Figure 6:
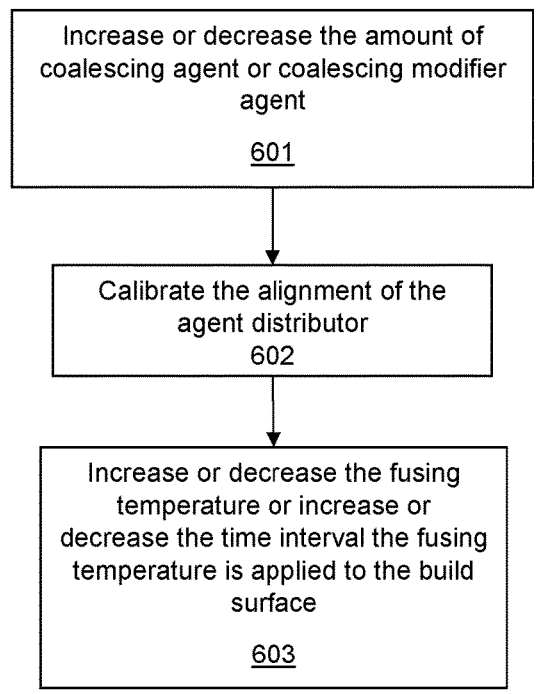
FIG. 6 is a flow diagram showing one example of an iterative process for enhancing edge sharpness.

FIG. 6 shows one example of a sequence of stages that can be worked through over a number of passes of adjustment of treatment settings. FIG. 6 thus illustrates a sequence that may be followed in one example of an edge enhancement routine. These stages may be implemented by a controller such as controller 209 illustrated in FIG. 2. These stages may be progressive, such that each stage may involve a series of successive adjustments for different build layers, for example in order to optimise that particular treatment setting.

As noted above one option to address poor edge definition may be to increase the amount of coalescence modifier agent. Therefore, a first stage of edge enhancement may involve increasing or decreasing 601 the amount of coalescence modifier agent delivered to the build material. In some examples, it may also involve increasing or decreasing the amount of coalescing agent delivered. In one example a series of iterations over the method in FIG. 5 may be performed to optimise the edge sharpness, wherein for each iteration, the amount of coalescence modifier agent or coalescing agent is modified in accordance with an edge enhancement routine such as illustrated in FIG. 6. The edge enhancement routine may therefore be implemented by a series of adjustments of treatment settings.

In some examples, the treatment settings may be stored in a suitable memory, along with an edge profile, or assessment of an edge profile of a build layer formed using those settings. In this example, when the edge enhancement routine is performed, the edge profile obtained in the last iteration may be compared to those of previous iterations. If the settings of the last iteration produced an improvement over previous iterations, then further modifications can be made towards the optimal values, i.e. the best achievable for adjusting that setting. For example, if increasing the amount of coalescence modifier agent improved the edge sharpness, then the edge enhancement routine may continue to incrementally increase the amount of coalescence modifier agent until applying further coalescence modifier agent has no further impact or begins to reduce the edge sharpness. At this point, the optimal amount of coalescence modifier agent has been found.

If after having adjusted the amount of coalescence modifier agent and/or coalescing agent, the output edges are still not within a tolerance of the reference profile, then in some examples the edge enhancement routine may move on to a next phase. In the example of FIG. 6 the edge enhancement routine may next adjust the alignment of an agent distributor. A lack of edge sharpness could be caused by an agent distributor being out of alignment and thus not delivering a relevant agent to the correct areas. Adjusting the alignment of an agent distributor may comprise calibrating 604 the alignment of the agent distributor. This may be done for example using an alignment routine, which may be part of a standard calibration process that would be performed from time to time, for example a pen alignment routine.

Again, this may be performed over a number of iterations in order to find optimal parameters and provides an awareness of misalignment issues that, otherwise, could not be detected. This results in an improvement of the robustness of the additive manufacturing system and its quality.

If after calibrating the alignment of the agent distributor, the treated layers of build material are still not within the tolerance of the reference profile, then, in the example of FIG. 6, the edge enhancement routine moves on to a third stage of adjusting the temperature profile. Modifying the temperature profile may comprise increasing or decreasing the fusing temperature or increasing or decreasing the time interval that the fusing temperature is applied. This may involve, for instance reducing the temperature of an energy source used during fusing, or moving the energy source more quickly across the build surface so as to reduce the amount of time that the build layer is exposed to the fusing temperature. Again, this may be performed over a number of iterations of the method outlined in FIG. 5, whereby the temperature profile is changed by the edge enhancement routine between forming layers of build material until the layer of build material is within a tolerance of the reference profile. As noted above, in some examples, the method may involve storing temperature settings in a memory, along with the resulting edge profile of a build layer formed with those settings.

In this example, when the edge enhancement routine is performed, the edge profile of the latest iteration may be compared to those of previous iterations. If the temperature settings of the latest iteration provide an improvement over previous iterations, then further modifications can be made towards an optimal value and/or until a build layer with an acceptable edge profile is produced. Once a layer has been printed with an edge profile within a tolerance of the reference profile, further adjustments may not be needed.

Examples thus provide methods of calibrating an additive manufacturing system. A calibration method may comprise determining an edge profile for a build layer formed by the system, the build layer comprising an area of solidified build material and an area of non-solidified build material. The edge profile may comprise a variation in height of the build layer across a transition between the area of solidified build material and the area of non-solidified build material. The method may comprise controlling a setting of the system to achieve or maintain a predetermined edge profile.

Methods of calibrating, for instance such as illustrated with respect to FIG. 5, may be performed once during a build process, for example at the beginning of a build process, to establish adequate settings, or may be performed repeatedly at intervals or substantially continuously to ensure that sharp edge profiles are maintained throughout the build process. For example, it may be necessary to perform the method periodically if the ambient conditions, such as average temperature of the build area, change during operation. In some examples, the method may be applied at regular intervals during the build process, such as every hundredth layer of build material or other suitable interval. In other examples, it may be used at random intervals for quality control purposes. A balance may be needed between running the method regularly enough to ensure accurate edges, yet not running the method so frequently that the build speed is adversely affected.

Using the methods of the examples described above, optimal edge profiles can be achieved irrespective of ambient conditions, ensuring that the build quality isn't affected by changes in ambient temperature or humidity for example. This can increase the robustness and accuracy of the build process and the quality of the finished objects.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method of fabricating a three dimensional object comprising:
    forming a build layer comprising an area of solidified build material and an area of non-solidified build material, wherein forming said build layer comprises depositing a layer of non-solidified build material and treating the build material to form the area of solidified build material; and
    determining an edge profile for the build layer, wherein determining the edge profile comprises measuring a variation in height of the build layer across a transition between the area of solidified build material and the area of non-solidified build material.

2. A method as in claim 1 comprising controlling a treatment setting for forming a subsequent build layer based on the edge profile.

3. A method as in claim 1 comprising determining whether a characteristic of the edge profile is within a tolerance of a reference characteristic and, if the characteristic of the edge profile is not within the tolerance, adjusting a treatment setting for forming a subsequent build layer.

4. A method as in claim 1 comprising controlling an amount of an agent applied to the non-solidified build material to control coalescence for a subsequent build layer based on the edge profile.

5. A method as in claim 1 comprising controlling alignment of a distributor to distribute an agent to the non-solidified build material to control coalescence for a subsequent build layer based on the edge profile.

6. A method as in claim 1 comprising controlling a setting of temperature applied to form a subsequent build layer based on the edge profile.

7. A method as in claim 1 wherein the variation in height is measured using an optical sensor.

8. A method as in claim 7 wherein the optical light sensor is optical focus error sensor.

9. An additive manufacturing system comprising:
    a build layer fabricator to form a build layer comprising an area of solidified build material and an area of non-solidified build material, wherein to form the build layer, the build layer fabricator is to deposit a layer of non-solidified build material and treat the build material to form the area of solidified build material;
    a sensor to measure a variation in height of the layer across a transition between the area of solidified build material and the area of non-solidified build material; and
    a controller to determine an edge profile for the build layer across the transition between the area of solidified build material and the area of non-solidified build material based on the measured variation in height of the build layer across the transition between the area of solidified build material and the area of non-solidified build material.

10. An additive manufacturing system as claimed in claim 9 wherein the controller is to control a treatment setting of the build layer fabricator based on the determined edge profile.

11. An additive manufacturing system as claimed in claim 10 wherein the controller is to determine whether a characteristic of the edge profile is within a tolerance of a reference characteristic.

12. An additive manufacturing system as claimed in claim 10 wherein the controller is to control an amount of an agent to control coalescence applied by the build layer fabricator based on the edge profile.

13. An additive manufacturing system as claimed in claim 10 wherein the controller is to control alignment of a distributor of the build layer fabricator based on the edge profile, wherein the distributor is to distribute an agent to control coalescence.

14. An additive manufacturing system as claimed in claim 10 wherein the controller is to control a setting of temperature applied by the build layer fabricator based on the edge profile.

15. A method of calibrating an additive manufacturing system comprising:
    determining an edge profile for a build layer formed by the system, the build layer comprising an area of solidified build material and an area of nonsolidified build material;
    wherein the edge profile comprises a variation in height of the build layer across a transition between the area of solidified build material and the area of nonsolidified build material; and
    controlling a setting of the system to achieve or maintain a predetermined edge profile.

* * * * *

UNITED STATES PATENT AND TRADEMARK OFFICE
CERTIFICATE OF CORRECTION

PATENT NO. : 10,449,722 B2  
APPLICATION NO. : 15/540921  
DATED : October 22, 2019  
INVENTOR(S) : Santiago Sanz Ananos et al.

Page 1 of 1

It is certified that error appears in the above-identified patent and that said Letters Patent is hereby corrected as shown below:

In sheet 1 of 4, Figure 1a, reference numeral 102, Line 4, delete "non- solidified" and insert -- non-solidified --, therefor.

In sheet 1 of 4, Figure 1b, reference numeral 102, Line 4, delete "non- solidified" and insert -- non-solidified --, therefor.

In Column 14, Line 43 (approx.), Claim 15, delete "nonsolidified" and insert -- non-solidified --, therefor.

In Column 14, Line 47 (approx.), Claim 15, delete "nonsolidified" and insert -- non-solidified --, therefor.

Signed and Sealed this  
Seventh Day of January, 2020

Andrei Iancu  
*Director of the United States Patent and Trademark Office*